United States Patent [19]

Kolehmainen

[11] Patent Number: 5,319,856
[45] Date of Patent: Jun. 14, 1994

[54] PRUNING DEVICE

[76] Inventor: Tenho Kolehmainen, Haavikontie 4, SF-83330 Kaatamo, Finland

[21] Appl. No.: 930,417
[22] PCT Filed: Mar. 14, 1991
[86] PCT No.: PCT/FI91/00073
§ 371 Date: Nov. 13, 1992
§ 102(e) Date: Nov. 13, 1992
[87] PCT Pub. No.: WO91/13736
PCT Pub. Date: Sep. 19, 1991

[30] Foreign Application Priority Data

Mar. 16, 1990 [FI] Finland .................................. 901311

[51] Int. Cl.⁵ ........................ B27B 17/00; B27B 9/00
[52] U.S. Cl. ...................................... 30/371; 30/390; 144/2 Z; 144/343
[58] Field of Search ............... 144/2 Z, 1 E, 1 F, 343; 30/276, 167, 371, 390

[56] References Cited

U.S. PATENT DOCUMENTS

| | | |
|---|---|---|
| 3,373,489 | 3/1968 | Giles . |
| 4,006,528 | 2/1977 | Katsuya .................................. 30/390 |
| 4,658,506 | 4/1987 | Nilsson . |
| 4,726,118 | 2/1988 | Mattson, et al. ...................... 30/371 |
| 4,827,617 | 5/1989 | Shepherd .............................. 30/371 |

FOREIGN PATENT DOCUMENTS

| | | |
|---|---|---|
| 0117848 | 9/1984 | European Pat. Off. ............... 30/371 |
| 1944204 | 3/1971 | Fed. Rep. of Germany . |
| 2539269 | 7/1984 | France . |
| 366200 | 4/1974 | Sweden . |
| 438977 | 5/1985 | Sweden . |

Primary Examiner—W. Donald Bray
Attorney, Agent, or Firm—Cushman, Darby & Cushman

[57] ABSTRACT

Objective of the invention is a pruning device for upright pruning of trees, to which pruning device belongs a shaft (1), an at the end (2) of the shaft through an articulated joint fastened support (3), an at the support fastened, rotatable cutting blade (4), an at the support fixed, with the cutting blade parallel running cutting support device (5) for leaning of the upright pruning device against the tree when cutting the branches as well as a with the cutting blade connected power source (6, 7) for the rotating of the cutting blade. When operating the present pruning devices the problem is the fact, that when using them the trunk of the tree is easily damaged, because the cutting is performed too close to the trunk of the tree. In the pruning device in accordance with the invention at the support (3) fastened on the end (2) of the shaft is fastened a fastening device (8), on which the cutting blade (4) is fixed adjustably parallel to the axis of the cutting blade for adjusting of the distance between the trunk of the tree and the cutting blade.

4 Claims, 3 Drawing Sheets

PRUNING DEVICE

BACKGROUND OF THE INVENTION

The object of this invention is a pruning device which allows for upright pruning of standing trees. Said pruning device comprises a shaft, one end of said shaft having a support which is articulatably joined to said shaft; a rotatable cutting blade; a cutting support device which is fixed parallel to the cutting blade for leaning the upright pruning device against a tree when cutting its branches; and a power source coupled to and rotating the cutting blade.

DESCRIPTION OF RELATED ART

The branches of trees in their growing stage are pruned off in order to obtain knotless and better raw-material from sawed timber. Conventional upright pruning of trees takes place by sawing with either a manually operated saw at the end of a shaft, or by different power equipped chain, circular or back and forth moving saws. When using a manually operated saw, problems still exist, for instance the slow working speed and the heaviness of the work, caused by the uncomfortable working position, and being accentuated by the pruning of branches located very high up. Also, when using a manual saw, the risk of branch breaking is large, which often damages the branch or tree trunk.

With the help of motor driven pruning devices, branches are more easily pruned, however poor maneuverability is still a problem, and the results of the work are inaccurate. With pruning devices of the present invention, branches can still be cut off too close to the trunk of the tree, damaging the trunk of the tree. When using conventional pruning devices, the length of the remaining stub of a branch varies considerably, depending upon the person performing the pruning operation and the prevailing pruning conditions, however no consistently even work is achieved.

An objective of the present invention is to bring forth a pruning device which eliminates some of the disadvantages of the conventional pruning devices. In particular, a purpose of the present invention is a pruning device which does not damage the trunk of a tree and the length of the stub of the branch remaining can be adjusted in advance of its cutting. Further, an aim of the present invention is to bring forward a pruning device which is uncomplicated in its structure and easy to operate.

Another object of the invention is achieved by a pruning device which is characterized by that which has been presented in the claims.

Another object of the invention is achieved by a pruning device, which has at one end of a shaft an articulated turning joint fastening a support, on which the cutting blade is fastened. A cutting support device is attached which is adjustable in the direction parallel to the axis of the cutting blade, in order to enable adjustment of the distance between the trunk of the tree and the cutting blade. When using a pruning device in accordance with the present invention, the pruning device is placed at the branch of the tree in such a way that the cutting support device is placed against the trunk of the tree, and the cutting blade of the pruning device is moved against the branch of the tree. When cutting a branch of the tree, the cutting support device is moved the cutting blade in accordance with the trunk of the tree, whereby a certain distance is maintained between the cutting blade and the tree trunk. The distance between the cutting blade and the cutting support device is adjustable, whereby the length of the remaining stub of the branch is easily predetermined. A device in accordance with the present invention is easy to operate because it is unnecessary to place the pruning device with such accuracy in relation to the branch of the tree, as must be done with conventional devices. Another advantage is in the fact that sawing performed in accordance with the present invention is performed from below upwards, whereas the branch to be cut is not torn off. Experiments have shown about a 30 percent higher speed has been achieved with pruning devices of the present inventions and the damage to the trees has been about 50 percent less compared with that of a hand saw. Because the cutting operation is quick, and because the branch is entirely cut off the danger of the saw blade sticking does not exist.

BRIEF DESCRIPTION OF THE DRAWINGS

In the following the invention is presented in more detail by referring to the attached drawing, in which.

SUMMARY OF THE INVENTION AND PREFERRED EMBODIMENT

Figure 1:
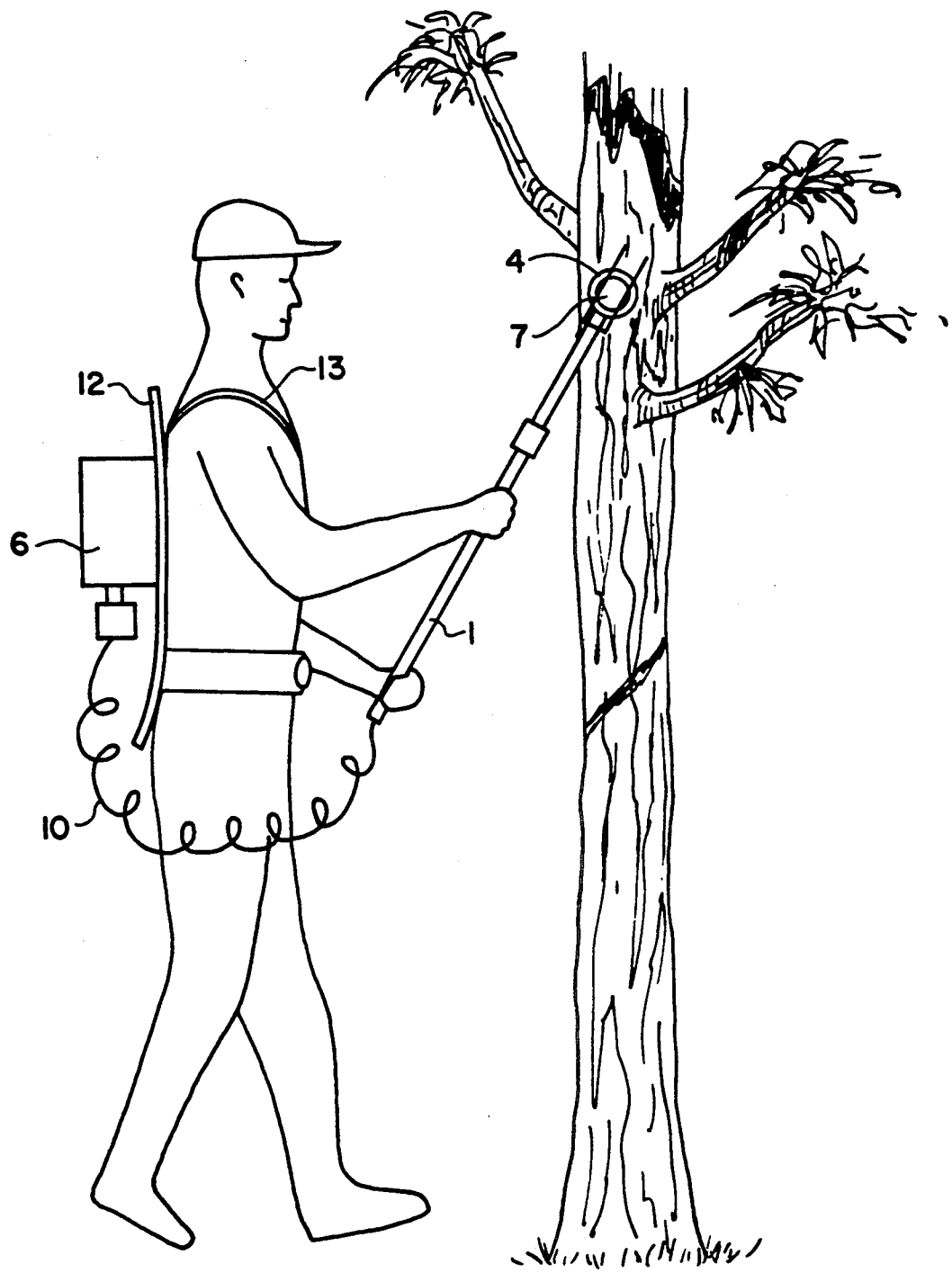
FIG. 1 is a schematical presentation of the operation of a pruning device in accordance with the present invention as seen from the side.

FIG. 1 shows a pruning worker equipped with one embodiment of a pruning device in accordance with the present invention. The pruning device comprises a steplessly adjustable shaft 1, at the one end of which is placed a rotatable cutting blade 4. The power source in this embodiment is a combustion motor-generator combination 6, which is by a power cable 10 connected with the electric motor 7 fastened on the end of the shaft, and which motor again for its part is arranged to rotate the cutting blade. The combustion motor-generator combination 6 is fastened on a rack 12 and the rack is fastened with a harness 13 and can therefore be put on the back of a worker. The power cable 10 is arranged to run protected inside the shaft 2.

Figure 2:
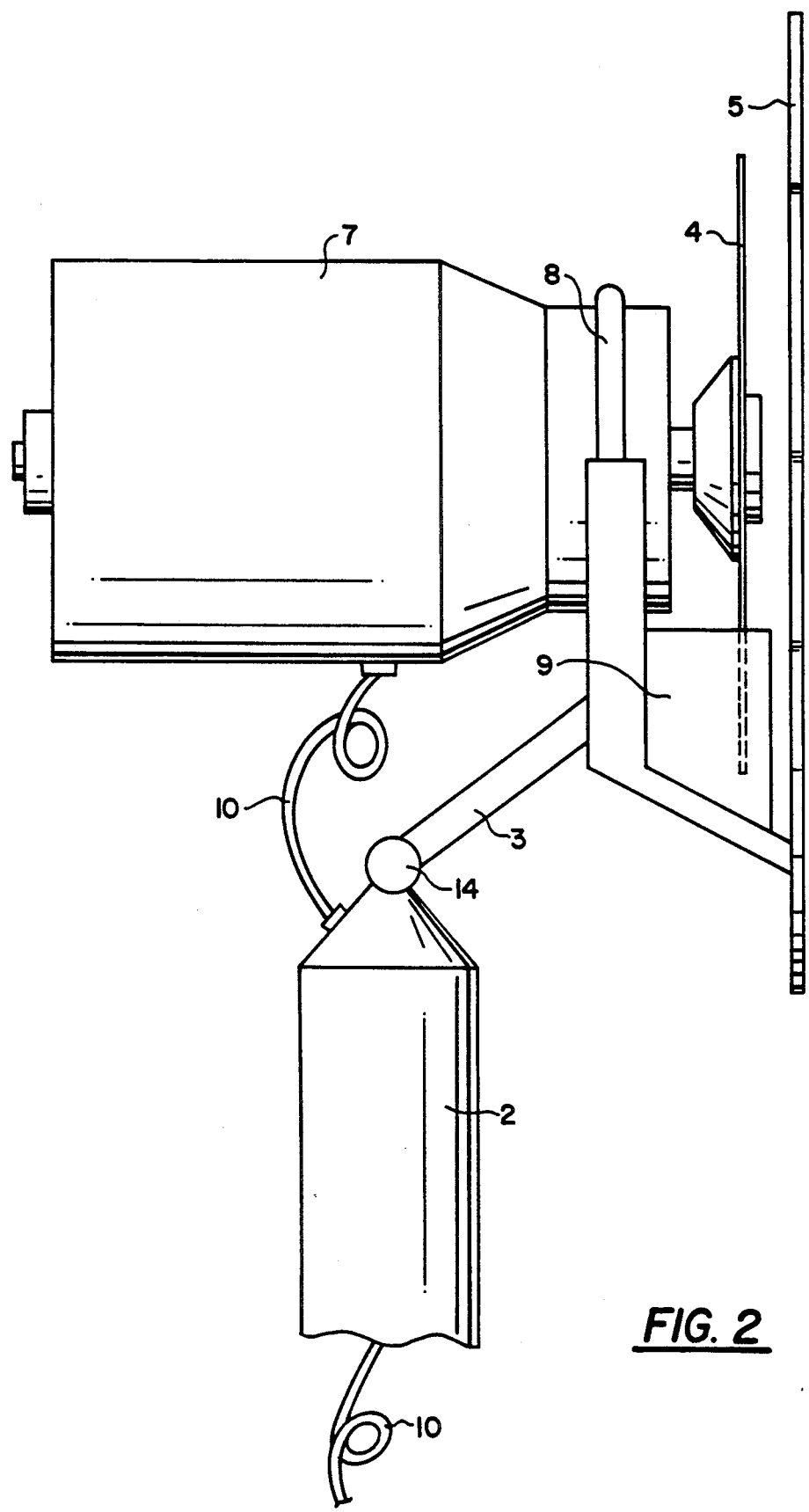
FIG. 2 is one embodiment of the pruning head of a pruning device in accordance with the present invention as seen from the side.
Figure 3:
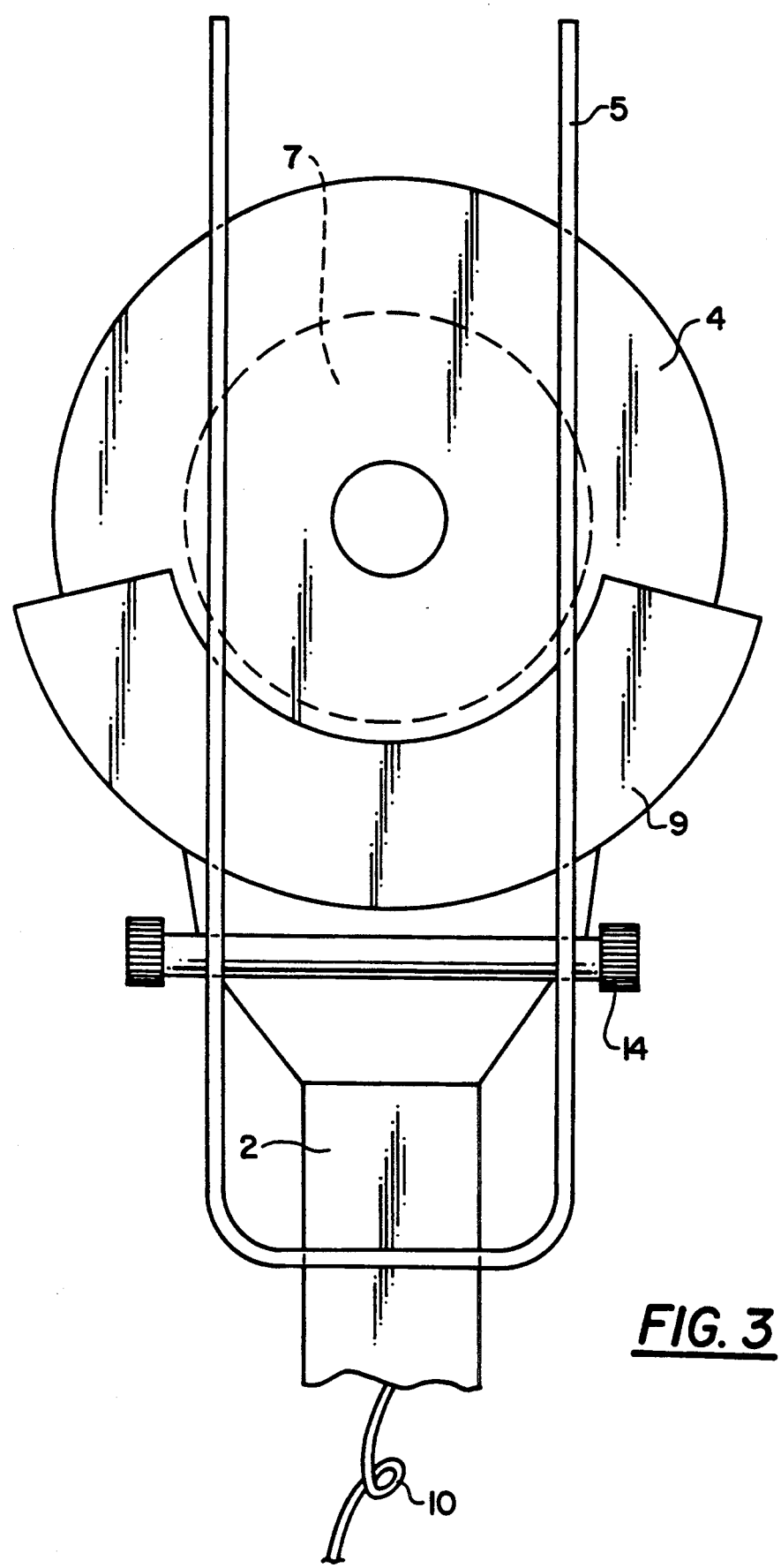
FIG. 3 is a device in accordance with FIG. 2 seen from another direction.

Referring to FIGS. 2 and 3, on the end of the shaft 2 is a turning joint 14 which fixedly articulates the support 3. The electric motor 7 and thereto connected cutting blade 4 are fastened on the support 3 parallel to the axis of the cutting blade 4 adjustably with the help of the fastening device 8. In this embodiment the fastening device 8 is primarily circular, corresponding to the form of the housing of the electric motor 7. The fastening device 8 is fixed by means of retention screws or other as such known fastening devices. On the support 3 is fastened further a cutting support device 5 which is parallel to the cutting blade, which in this embodiment is formed by two parallel rods. The form and structure of the cutting support device 5 can vary in the different embodiments of the invention. The support 3 has additionally a blade protector 9 fastened at the spot of the cutting blade 4 which is arranged to prevent the arising sawdust and other debris from falling directly on the worker.

When using a device in accordance with the present invention, the cutting blade 4 is adjusted to the desired angle with the help of the turning joint 14, and the end of the shaft 2 is brought near the branch of the tree in such a manner that the rods of the cutting support device 5 can be placed on both sides of the branch against the trunk of the tree. The device is moved in the direction of the branch, whereby the cutting blade 4 cuts the branch off and the stub of the branch remains. The length of the stub of the branch can be changed by adjusting the distance between the cutting blade 4 and the rods of the cutting support device 5. When using a device of the present invention the trunk of the tree is not damaged and the stub of the branch is of the desired length.

The present invention is not limited to the presented preferred embodiment, but it can vary within the concept of the invention determined by the claims.

I claim:

1. A pruning device comprising:
  a support rod;
  a shaft having at one end a turning joint which articulatably adjusts said support rod;
  a fastening device fixed with said support rod;
  power means, adjustably fixed with said support rod by said fastening device, for rotating a rotatable cutting blade; and
  a cutting support device fixed with said support rod and being substantially parallel to said rotatable cutting blade;
  wherein said power means is adjustably fixable to maintain a predetermined distance between said rotatable cutting blade and said cutting support device.

2. A pruning device in accordance with claim 1 wherein said cutting support device includes at least one cutting support rod.

3. A pruning device in accordance with claim 1, further comprising a blade protector fixed with said support rod.

4. A pruning device in accordance with claim 3, wherein said cutting support device includes at least one cutting support rod.

* * * * *